United States Patent [19]

Bononi

[11] 4,354,744
[45] Oct. 19, 1982

[54] FRAME FOR EYEGLASSES

[76] Inventor: Walter H. Bononi, Zeppelinstrasse 9, 7012 Fellbach-Schmiden, Fed. Rep. of Germany

[21] Appl. No.: 186,893

[22] Filed: Sep. 15, 1980

[30] Foreign Application Priority Data

Sep. 24, 1979 [DE] Fed. Rep. of Germany ....... 2938492

[51] Int. Cl.³ .......................... G02C 5/14; G02C 5/22
[52] U.S. Cl. ...................................... 351/153; 351/121
[58] Field of Search .................... 351/122, 139, 68, 76, 351/81, 89, 99, 1, 101, 121, 153, 136; 2/14

[56] References Cited

U.S. PATENT DOCUMENTS 2,684,014 7/1954 Fairly ................................... 351/153
3,025,762 3/1962 Vigano ................................. 351/121

FOREIGN PATENT DOCUMENTS 868776 5/1961 United Kingdom ................ 351/153

Primary Examiner—John K. Corbin
Assistant Examiner—Rodney Bovernick

[57] ABSTRACT

An optical frame has a lens bow and two temples connected via a hinge joint on the lens bow, with the temple having a stop surface to contact the lens bow. An elastic cushion is arranged between the stop face surface of the temple and the lens bow. The cushion comprises a base plate and a portion extending from the end of the base plate at an angle of less than 90 degrees.

5 Claims, 3 Drawing Figures

FRAME FOR EYEGLASSES

The invention concerns an optical frame with a lens bow and two temples connected via a hinge joint on the lens bow, with a temple having a stop face surface to contact the lens bow.

BACKGROUND OF THE INVENTION

Hinged temples in prior art eyeglasses of this kind are roughly perpendicular to the lens bow. This limits the temple opening angle since the stop face area is on the hinge joint of the end of the temple at the lens bow. The disadvantage of this is that this stop face limitation is rigid. This rigid stop face limitation often results in bending when the eyeglasses are used. In addition, the hinge joints are often overloaded so that they loosen and adversely affect the fit of the eyeglasses. A further disadvantage is that the course of the temple must be accurately adapted to the shape of the head of the eyeglass wearer. If the swivel range of the temple at the hinge joint is too small, the rigid stop face of the temples will exert a disturbing pressure on the head of the eyeglass wearer so that the wearer will usually soon take off the glasses.

OBJECT AND STATEMENT OF THE INVENTION

Accordingly, an object of the invention is to provide an optical frame of the type described so that a spring loaded contact of the temple on the lens bow can be achieved by a simple uncomplicated molded part.

According to the invention, this object is solved by arranging an elastic cushion between the stop face surface of the temple and the lens bow.

The invention offers the following advantages:

(a) The stop of the temple on the lens bow at the hinge joint is flexible.

(b) External forces impacting the temple are absorbed elastically.

(c) A bending of the temple is largely avoided. The shape of the temple remains stable.

(d) The hinges are protected. Overstressing is largely prevented. There is no loosening so that the eyeglasses retain their exact fit for a long period of time.

(e) The temples fit the shape of the head elastically so that tedious readjustments are, for the most part, unnecessary.

(f) The rubbery elastic cushioning results in only small support counterforces so that the temples adjust smoothly to the head of the eyeglass wearer and exert no uncomfortable pressure against the head.

(g) In children's glasses especially, which are subjected to increased stress, the glass frame lasts longer because of the rubbery elastic cushioning of the temple stop face.

(h) The elastic cushion can be made inexpensively with simple material.

(i) Due to the favorable material elasticity, the functional efficiency of the elastic cushion can be maintained for a long time.

In addition, the invention includes the following advantageous features:

The elastic cushion has a portion overlapping the outside edge of the lens bow. The features provide a good support of the elastic cushion on the lens bow.

The elastic cushion has a base plate and the portion is arranged on the base plate at an angle of less than 90° between the base plate and the portion. The features ensure an undercut shaped design for the firm fit of the elastic cushion on the lens bow.

The portion of the elastic cushion has external surface grooving. The features provide between handling of the optical frame. The grip when the optical frame is put on or taken off is increased by the surface grooving. Moreover, the surface grooving provides a rustic surface form, especially preferred in children's glasses.

The surface grooving overlaps the outside area of the lens bow. The features protect against damage and scratches on the working edges.

The free end of portion is rounded. The features provide a continuous transition and avoidance of corner projections.

The lens bow has a recess and the elastic cushion is set form-closed in the recess. The features enable the elastic cushion at the place preestablished by the recess to be held in place immovably on the lens bow.

The thickness of elastic cushion is greater than the depth of the recess. The features permit a large spring path for the end stop of the temple.

The elastic cushion has a base plate with an opening and each hinge joint has a solid journal bearing which passes through the opening. The features provide an additional centering fo the elastic cushion.

The end of the temple has a hinge part and the elastic cushion has a base plate with a projection resting under elastic pretension on the hinge part of the end of the temple. The features enable a friction braking in the hinge joint region. This enables the temples to open and close satisfactorily. When the temples are folded there is an additional arrest in this case which fixes the temples in the place parallel to the lens bow and prevents an unintentional swinging open of the temples.

The hinge part on the end of the temple has an arc-shaped braking area and the projection of the elastic cushion has a concave pressure surface. The features provide a favorable embodiment of a reliable friction braking with simple means.

The elastic cushion is mirror-symmetric to a plane running transversely to the axis of the hinge joints. The features provide a left and right use of the elastic cushion. This means the elastic cushion need only be made in a single design form.

The elastic cushion has a base plate which runs parallel to the plane of the lens bow and the stop face is at the end of the temple adjacent to the base plate. The features provide a simple design of the end of the temple with the stop face surface in the plane parallel to the lens bow.

The temple has an extension part at its end overlapping the outside edge of the lens bow, the stop face is arranged on the side of the extension part turned towards the outside edge, and the stop face rests on the portion of the elastic cushion. The features provide an advantageous lateral support of the temple at the periphery of the lens bow.

The bow has an extension bar which carries a solid journal bearing of the hinge joint, and the elastic cushion is arranged on the extension bar. The features provide an advantageous arrangement of the elastic cushion at an extension bar at a distance away from the lens bow. These kinds of extension bars for the hinge joint arrangement are often used in metal optical frames.

The hinge joint has a recess and the elastic cushion has a clamping attachment pin in the recess. The features enable the elastic cushion to be held in place.

The hinge joint has a solid journal bearing with a bottom part, and the elastic cushion rests against the bottom part. The features provide a support for the elastic cushion at the bottom of the solid journal bearing, so that displacement is avoided.

The hinge joint has a solid journal bearing with a bottom part and the recess occupied by the attachment pin of the elastic cushion is arranged in the bottom part. The features provide a space-saving clamp holding arrangement of the fastening pin.

The attachment pin is arranged obliquely on elastic cushion in such a way that the angle between the attachment pin and the extension bar is less than 90°. The features provide a long clamp seat and an undercut stop against unintentional loosening of the elastic cushion.

The thickness of the elastic cushion is somewhat greater than the thickness of the extension bar. The features provide a small material-saving design of the elastic cushion, whose thickness is used essentially for the function of the spring stop.

Both sides of the elastic cushion has a wall projection on the outside overlapping the free end of the extension bar and the end of the temple. The features provide an expansion joint cover at the stop face of the temple and at the opposite side of the free end of the extension bar.

DESCRIPTION OF THE DRAWINGS

Details of the invention are evident from the following description and symbols shown schematically in the preferred embodiment, where.

DETAILED DESCRIPTION OF THE INVENTION

Figure 1:
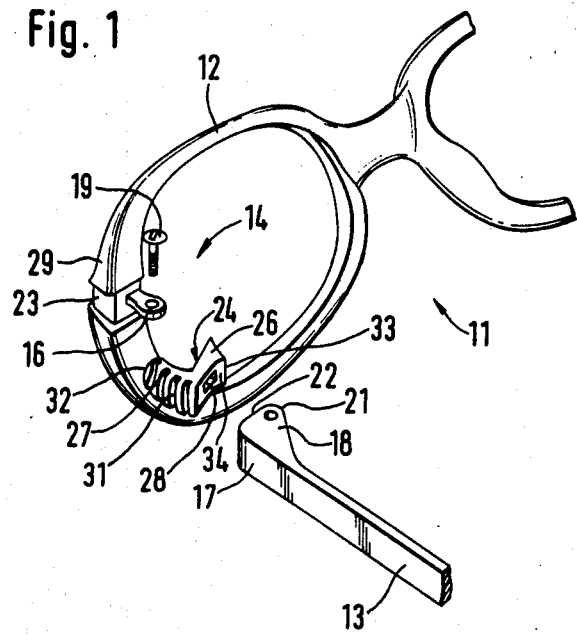
FIG. 1 is an optical frame according to the invention in an exploded representation.

Optical frame 11 shown in FIG. 1 has a lens bow 12, both outside parts of which are each attached by hinge joint 14 to temple 13. Hinge joint 14 consists of solid journal bearing 16 attached to lens bow 12 and hinge part 18 arranged at the end 17 of temple 13.

Hinge part 18 is attached to solid journal bearing 16 by screw 19 which forms the axis of hinge joint 14. In addition, hinge part 18 has an arc-shaped braking area 21. Stop face 22, running transversely to the longitudinal direction of temple 13, is arranged at the end of the temple 17.

Lens bow 12 has a recess 23 in the region of hinge joint 14. There is an elastic cushion 24 between lens bow 12 and the end 17 of temple 13. This elastic cushion 24 has a base plate 26 and a portion 27 arranged at an angle to it and is embedded in closed form in recess 23. Solid journal bearing 16 in this case passes through opening 28 of base plate 26. The angle between base plate 26 and portion 27 is less than 90° so that there is an undercut snug fit via portion 27 connecting outer edge 29 of lens bow 12.

Thickness of base plate 26 and portion 27 is about twice the depth of recess 23. The outside of piece 27 of elastic cushion 24 has surface grooving 31. This surface grooving 31 projects beyond the outer area of lens bow 12 so that there is firm handling and edge protection. The free end of portion 27 is rounded shape 32 to provide flowing transition from lens bow 12 to portion 27 and avoid interfering angular edges.

Projection 33 is arranged on the end of base plate 26 turned away from portion 27. Projection 33 has a concave pressing surface 34 which fits braking area 21 of hinge part 18. Pressure surface 34 presses with elastic prestress against braking area 21. This provides a frictional braking area which arrests temple 13 in the retracted position parallel to lens bow 12 and prevents an unanticipated back and forth motion when temple 13 swings horizontally.

Elastic cushion 24 is designed in mirror-image form in a plane running perpendicularly to the axis of hinge joint 14. This makes it possible to manufacture elastic cushion 24 in only one design and still use it on both the left and right sides of lens bow 12. This elastic arrangement always guarantees a correct position of optical frame 11 on the head of the eyeglass wearer. In addition, in the case of a bending over of temple 13 outward, a resilient cushion is provided by elastic cushion 24, which largely prevents damage to hinge joint 14 and bending of temple 13. The material composition of elastic cushion 24 is selected so that a long life with especially fatigue-free long-term elasticity is provided.

Figure 2:
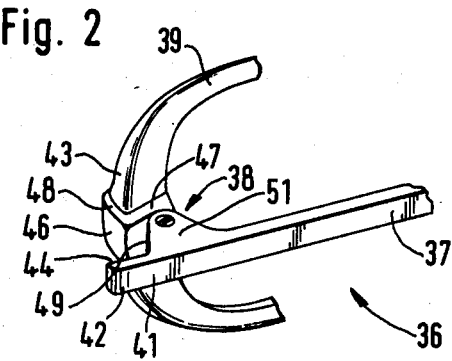
FIG. 2 is another embodiment of an optical frame according to the invention.

In the optical frame 36 shown in FIG. 2, temple 37 is connected by hinge joint 38 to lens bow 39. Temple 37 has an extension 42 at the end of temple 41. Extension part 42 has stop face 44 on the side turned towards outside 43 of lens bow 39. In the region of hinge joint 28, lens bow 39 has a rubbery elastic cushion 46 with base plate 47 and portion 48 arranged at an angle less than 90°. Opened temple 37 has stop face of extension part 42 at portion 48 of elastic cushion 46. This makes it possible to achieve an elastic double reinforcement while, in addition, stop face 49 of the temple side of hinge 51 is arranged on base plate 47.

Figure 3:
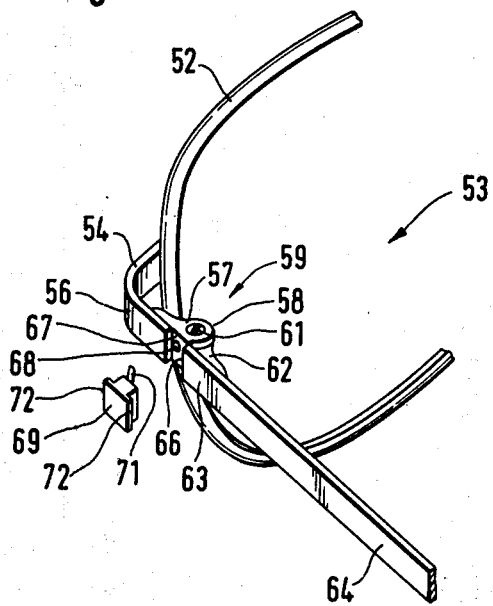
FIG. 3 is a further embodiment of an optical frame according to the invention.

Metal lens bow 52 of optical frame 53 shown in FIG. 3 also has a metal extension bar 54 bent approximately at a right angle. A bottom part 57 of solid journal bearing 58 or a hinge joint 59 is attached to free leg 56 of extension bar 54. Hinge part 62 is attached to swivel on solid journal bearing 58 via screw 61 forming the hinge axis. Hinge part 52 is attached to the start of temple 63 of metal temple 64. There is a distance 67 between the free end of leg 56 and stop face 66 at temple 64. Bottom part 57 in the region 67 of this space has a bore recess 68 running obliquely in the direction of lens bow 52.

In the region of space 67 a rubbery elastic cushion 69 is inserted which rests against bottom part 57 and on the back of which is attachment pin 71. Attachment pin 71 points obliquely towards lens bow 52 so that the angle with leg 56 of extension 54 is less than 90°. Attachment pin 71 is held by a spring in recess 68 of bottom part 57 so that elastic cushion 69 cannot be lost.

Thickness of elastic cushion 69 is somewhat greater than the thickness of leg 56 and temple 64. Elastic cushion 69, on the side turned towards the free end of leg 56, as well as the side turned towards stop face 66, has wall projections 72 which overlap the parts on the outside to provide a butt joint cover.

I claim:

1. An optical frame comprising a lens bow, two temples, hinge joints connecting the temples to the lens bow; each temple having a stop face on one end to rest against the lens bow, and an elastic cushion arranged in the region of each hinge joint between the lens bow and the stop face of the temple and wherein:

the elastic cushion comprises a base plate and an elastic portion arranged on the base plate at an angle of less than 90 degrees and overlapping the outside edge of the lens bow,
the lens bow has a recess and the elastic cushion is set in the recess,
the thickness of the elastic cushion is greater than the depth of the recess,
the base plate has an opening,
the lens bow has a first part of the hinge joint thereon in the form of a solid journal bearing which passes through the opening in the base plate,
the end of the temple has a second part of the hinge joint thereon and the base plate has a projection resting under elastic pretension on the second hinge part,
the second hinge part has an arc-shaped braking area and the projection has a concave pressure surface,
the base plate runs parallel to the plane of the lens bow, and
the temple has a straight extension part at its end which, when the temple is open, overlaps the outside edge of the lens bow, the stop face is arranged on the side of the extension part facing towards the outside edge of the lens bow, and the stop face rests on the elastic portion arranged on the base plate to overlap the outside edge of the lens bow.

2. An optical frame according to one of claim 1 in which the portion of the elastic cushion has external surface grooving.

3. An optical frame according to claim 2, in which the surface grooving overlaps the outside area of lens bow.

4. An optical frame according to one of claim 1 in which the free end of the portion is rounded.

5. An optical frame according to one of claim 1, in which the elastic cushion is mirror-symmetric to a plane running transversely to the axis of the hinge joints.

* * * * *